United States Patent Office 3,560,196
Patented Feb. 2, 1971

3,560,196
BIOLOGICALLY ACTIVE PARTICULATE MATERIAL AND THE PROCESS FOR MANUFACTURING SAME
John C. Horai, Hagerstown, and Stephen F. Tucker, Clear Spring, Md., assignors to The Ruberoid Co., New York, N.Y., a corporation of New Jersey
No Drawing. Filed Apr. 26, 1967, Ser. No. 633,718
Int. Cl. A01n 9/24
U.S. Cl. 71—115     4 Claims

ABSTRACT OF THE DISCLOSURE

Biologically active particulate material capable of releasing a biochemical at a controlled rate due to the change of environmental conditions, is manufactured by coating granules in the range of 10 to 50 mesh with a biochemical and a silicate binder and thereafter partially insolubilizing the binder.

BACKGROUND OF THE INVENTION

(I) Field of the invention

This invention relates to biologically active particulate materials capable of releasing a biochemical at a controlled rate due to the change of environmental conditions. The invention also relates to the process for manufacturing said particulate materials. The biochemicals referred to in this specification include toxicant compositions which are effective, for example, for killing or controlling the growth of plants, insects, microorganisms, fungi, and bacterias and also include chemicals which are repugnant to animals. These chemicals are more commonly known as pesticides, herbicides, insecticides, bactericides, fungicides, repellents, etc.

(II) Background of the invention

Biologically active materials such as pesticides are commonly used in the forms of a spray or a dust and more recently, they have become available commercially in the form of dry granules. The use of biologically active materials in the form of dry granules has many advantages over the more conventional spray or dust. Their use, for example, eliminates the problem of drift associated with the application of dust and spray. The application of dry granuules is simple and rapid and adaptable for use in efficiently controlled machinery, such as hoppers equipped with a preset rate gauge and the dry granules provide better through-foliage penetration reaching the water or land being treated. Furthermore, the dry granular materials are premixed and ready to be used, thus eliminating the inconvenience of on-the-site mixing and measuring. They can be applied simultaneously with cultivation, seeding or fertilizing hence lowering the application time and costs. The dry granules may also contain one or more biochemicals with different biological activities.

Heretofore biologically active granules were produced by incorporatinng the toxicant, in or upon pelletized powders such as Fuller's earth, attaclay, pumice, calcined diatomaceous earth and chemical compounds. The release of the toxicant is based generally on the porosity of the granule or on the disintegration of the granule in the presence of water with or without the presence of swelling agents therein, or on the combination of both. Release based on these methods is not completely satisfactory because it does not provide the release of toxicants at a controlled rate for effective treatment of the area for extended periods of time while still providing a fast enough release for the immediate control.

SUMMARY OF THE INVENTION

We have found that disadvantages of the prior biologically active granules can be substantially overcome by the particulate material of this invention. Broadly stated, the biologically active particulate material of this invention comprises a granular carrier having coated thereon a biochemical and a partially insolubilized silicate binder. Advantageously, the particulate material is prepared by mixing a granular carrier with a biochemical and a silicate binder to provide a coating on the carrier and thereafter drying or chemically reacting the thus coated granules to partially insolubilize the silicate binder.

The biologically active particulate material of this invention is capable of releasing the biochemical at a controlled rate upon the change of environmental conditions such as those normally encountered by the herbicides and pesticides. Preferably, the release of the biochemical is initiated by rainfall or humidity or by the change of temperature. We have discovered that by varying the thickness and the solubility of the silicate binder, it is possible to provide biologically active particulate material which will provide immediate release of biochemicals for adequate control of undesirables in the area to be treated and still maintain a sustained release of the biochemicals for an extended period of time.

DESCRIPTION OF THE PREFERRED EMBODIMENTS

A number of natural and artificial granules can be used as carriers for the biologically active particulate material. Preferably a dense mineral granule is used. Suitable mineral granules, for example, are diabase, calcite, basalt, limestone, and greenstone rhyolite. The granular carriers preferably are graded and have a size in the range between 10 and 50 mesh. Size above or below the preferred range, however, can also be used.

The biochemicals used to coat the carrier can be any suitable chemical with biological activities. For example, they may be selected from the large groups of compositions approved by the U.S. Department of Agriculture such as amiben acid (3-amino-2,5-dichlorobenzoic acid), chloro IPC (isopropyl-N-(3-chlorophenyl)carbamate), casaron W–50 (dichlorobenzonitrile) and dipotassium endothal (dipotassium-3,6-endohexahydrophthalate). Additional examples of suitable biochemicals include D.D.T.; Dieldrin (1,2,3,4,10,10 - hexachloro-exo-6,7-epoxy-1,4,4a, 5,6,7,8,8a-octahydro-1,4-endo, exo - 4,8 - dimethanonaphthalene); sesone (sodium 2,4-dichlorophenoxyethyl sulfate); malathion (S-(1,2-dicarbethoxyethyl)-O,O-dimethyl phosphorodithioate) and parathion (O,O-diethyl O-p-nitrophenyl phosphorothioate).

The amount of biochemicals to be used in preparing the biologically active particulate material of this invention depends on a number of factors. In general, the biological activity of the resultant material increases with increasing amounts of biochemicals. The rate of release, however, is dependent to a large extent on the silicate binder as will be discussed hereinbelow in greater detail. We found as little as 1% of biochemical based on the weight of the granules will provide beneficial biological activities for certain controls. It is advantageous, however, to use between 3% to 20% based on the weight of granules.

The silicate binder used for coating, preferably is an alkali silicate. For some appliactions, potassium silicate is more suitable because agriculturally used land has greater tolerance for potassium ion than the sodium ion. Other types of silicates which can be insolubilized readily and do not adversely affect the biological activities of the biochemicals used are also suitable.

The amount of silicate binder to be used for coating is determined by the desirable biochemical release rate and the extent of the insolubilization. A sufficient amount must be used to bond the biochemical and to provide a coating on the carrier. A higher degree of insolubilization will provide a slower release of biochemicals, and less insolubilization, a higher rate. By varying the degree of insolubilization, it is possible to control the release of the biochemical of the particulate material of this invention.

The partial insolubilization of the silicate binder is carried out by heating to a temperature below the range which will substantially adversely affect the biological activity of the chemical. For heat sensitive biochemicals, chemical insolubilization can be used. Acid pickling agents such as ammonium chloride, aluminum chloride, calcium chloride, hydrochloric acid can be used in the partial insolubilization process. In some instances where the toxicant is a salt of calcium or that of an acid, it will, in itself, partially insolubilize the silicate film. In such cases, controlled solubility is accomplished by regulating the amount of silicate used.

In manufacturing the particulate material of this invention, the graded mineral granules are first coated with the biochemical in any suitable manner and thereafter the silicate solution is applied thereon. Partial insolubilization may be achieved by drying the thus coated granules at a controlled temperature. Alternatively, the biochemical, in some instance, is advantageously coated on the granular carrier simultaneously with the silicate binder.

As stated hereinabove, the solubility of the silicate film regulates the release of the active agent. Since the solubility of the film can be controlled by its thickness, by degree of drying at temperatures tolerable by the particular toxicant used, and by various concentrations of pickling agents, biologically active granules may be custom tailored for a variety of applications. Furthermore, for special applications, two or more layers of silicate coating can be used to bond one or more biochemicals onto the carrier.

Further to illustrate this invention, specific examples are described hereinbelow. In these examples, particulate material of this invention with three different release rates identified hereinbelow as fast release, intermediate release and slow release and biological activities were compared with standard attaclay granules containing an equal amount of amiben.

EXAMPLE I

Fast release granules

In preparing the fast release coating one ton of crushed and graded dry greenstone granules passing a 20 mesh screen and retained on a 40 mesh (screened material is mixed with 100 pounds of a herbicide, amiben acid (3-amino-2,5-dichlorobenzoic acid) in a tumbling barrel type mixer until the granules are coated with the herbicide. Then 80 pounds of Kasil No. 1( potassium silicate with a $K_2O:SiO_2$ ratio of 1:2.50 supplied by the Philadelphia Quartz Company) diluted with 25 pounds of water are mixed with the amiben coated granules until the granules are uniformly coated. At the end of the mixing cycle the coated granules are dried at a temperature of 150° F.

EXAMPLE II

Intermediate release granules

In preparing an intermediate release type coating, formula and method are the same as cited in Example I except the amount of Kasil is decreased to 40 pounds and the water to 10 pounds per ton.

EXAMPLE III

Slow release granules

In preparing slow release coatings, composition and method are the same as in Example II except after drying, the coated granules are post treated with 5 pounds of a 28% aluminum chloride solution.

To show the biological activity and controlled release rates of the granules of the present invention, slow, intermediate and rapid release granules prepared according to Examples Nos. I, II and III were evaluated in the greenhouse using Wong Barley as a bioassay and the release of amiben from granules was determined using a modification of Sutherland's method (WSA Abstracts, 1964). The bioassay was conducted in the greenhouse in 4 inch plastic pots with unsterilized soil. Wong Barley was used as a bioassay. Formulated granules were applied to give 4 pounds amiben per acre and were covered with 0.25 inch of sand. One complete set of treatments including untreated controls was leached with 3 inches of water, applied with a hose and sprinkler in 0.5 inch increments. Ten barely seeds were planted in each pot immediately after leaching. Barley tops were harvested and weighed three weeks after planting.

Release of amiben from granules was studied using a modification of Sutherland's method. Whatman No. 1 filter paper discs, 8 cm., were placed in 10 cm. plastic petri dishes and moistened with 1 ml. of distilled water each. Sufficient granules to give 2 mg. amiben about 3.6 pounds per acre were distributed on each filter paper and exposed for 2 hours. The filter papers were dried and extracted, and the extracts were analyzed colormetrically for amiben.

A comparison of release rates and biological activity of the coated granules are presented in Table No. I.

TABLE NO. I

| Herbicide formation | Release rate [a] | Barley response [b] |
|---|---|---|
| Control | 100 | 100 |
| Attaclay granules | 76 | 85 |
| Fast release granules | 30 | 32 |
| Intermediate release granules | 17 | 40 |
| Slow release granules | 15 | 27 |

[a] Percent release of active ingredient during 2 hours exposure to a wet filter paper.
[b] Barley fresh weight as a percent of controls with barley planted immediately after leaching and harvested 3 weeks later.

Release of amiben from the slow, intermediate and fast controlled release granules prepared according to the methods disclosed in the specific examples were also studied in an aqueous media. Granule under study which included standard attaclay control granules containing 0.2 gram of amiben were immersed in distilled water for periods extending to 18 days. Periodically the solutions were analyzed colormetrically for amiben to determine release rates as a function of time. Data obtained is tabulated in Table No. II.

TABLE NO. II

| | Attaclay | Percent amiben released | | |
|---|---|---|---|---|
| | | Slow | Intermediate | Fast |
| Soak time Days: | | | | |
| 4 | | 44 | 50 | 62 |
| 8 | | 60 | 68 | 82 |
| 11 | | 78 | 86 | 100 |
| 16 | | 94 | 100 | |
| 18 | | 100 | | |
| 15 hours | 100 | | | |

From these results it is seen that the herbicide granules prepared according to the methods of the present invention are biologically active and the rate of release of the active agents can be controlled to insure effectiveness of the treatment over extended periods of time.

We claim:
1. A process for manufacturing biologically active particulate material capable of releasing a biochemical at a controlled rate which comprises mixing dense mineral granules having a size in the range between 10 and 40 mesh with an effective amount of 3-amino-2,5-dichlorobenzoic acid, then admixing the thus coated granules with an alkali silicate solution, and partially insolubilizing the silicate by reacting it with an acidic pickling composition.

2. A process for preparing granules capable of releasing 3-amino-2,5-dichlorobenzoic acid at a controlled rate which comprises mixing one ton of dense mineral granules having a size of the range between 10 and 40 mesh with 100 pounds of 3-amino-2,5-dichlorobenzoic acid for a period sufficient to coat the granules with said acid, coating the thus acid coated granules with a binder comprising 40 to 80 pounds of potassium silicate having a ratio of $$K_2O:SiO_2$$

of 1:2.50 and 10 to 25 pounds of water, drying the resultant granules at a temperature of about 150° F., and further treating the dried granules with 5 pounds of 28 percent aluminum chloride solution.

3. The process of claim 1 wherein the acidic pickling composition contains as the active acid pickling agent a member selected from the group consisting of ammonium chloride, aluminum chloride, calcium chloride, hydrochloric acid, and mixtures thereof.

4. The process of claim 3 wherein the acid pickling agent is aluminium chloride.

References Cited

FOREIGN PATENTS 589,926   12/1959   Canada _____ 71—A.D.

JAMES O. THOMAS, JR., Primary Examiner

71—88, 105, 111; 424—212, 213, 278, 303, 355

U.S. Cl. X.R.